(12) United States Patent
Leow

(10) Patent No.: US 9,953,151 B2
(45) Date of Patent: Apr. 24, 2018

(54) SYSTEM AND METHOD IDENTIFYING A USER TO AN ASSOCIATED DEVICE

(71) Applicant: Chon Hock Leow, Menlo Park, CA (US)

(72) Inventor: Chon Hock Leow, Menlo Park, CA (US)

( * ) Notice: Subject to any disclaimer, the term of this patent is extended or adjusted under 35 U.S.C. 154(b) by 296 days.

(21) Appl. No.: 15/014,178

(22) Filed: Feb. 3, 2016

(65) Prior Publication Data

US 2016/0224776 A1    Aug. 4, 2016

Related U.S. Application Data

(60) Provisional application No. 62/111,325, filed on Feb. 3, 2015.

(51) Int. Cl.
*G06F 21/32* (2013.01)
*G06F 21/34* (2013.01)

(52) U.S. Cl.
CPC .............. *G06F 21/32* (2013.01); *G06F 21/34* (2013.01)

(58) Field of Classification Search
CPC ..................... G06F 21/32; G06F 21/34–21/35
See application file for complete search history.

(56) References Cited

U.S. PATENT DOCUMENTS 7,203,346 B2    4/2007 Kim et al.
8,090,160 B2    1/2012 Kakadiaris et al.
8,261,090 B1    9/2012 Matsuoka
(Continued)

FOREIGN PATENT DOCUMENTS

WO    2005111935 A1    11/2005

*Primary Examiner* — Kevin Bechtel
(74) *Attorney, Agent, or Firm* — John C. Merchant

(57) ABSTRACT

The present system and method enables the automatic detection and identification of authorized users within proximity of a computing apparatus and, after verifying, using biometric detection and analysis, that the user is authorized to access the target, providing the user with such access. The system comprises a computer appliance target requiring authentication of a user in order to access the target, including software stored on and executing from the target, a biometric input device, and a transceiver enabling short-range wireless communication with other wireless capable devices; a database accessible to the target; and a beacon device associated with the user, including at least a transceiver and a locally stored encrypted identity token associating the device with the identity of the user; wherein the transceiver on the target periodically scans for the beacon device within the short-range, and upon detection, establishes communication with the beacon device and requests the identity token, the beacon device receives the request and sends the identity token back to the target which decrypts and validates the token by comparing token data with stored token data in the database and upon successful decryption and validation of the identity token, the software initializes a biometric test input to positively identify the user in possession of the beacon, wherein the software of the target attempts to match the biometric input with second biometric input of the user stored in the database and upon a successful match, unlocks the target and allows the user to operate the target.

16 Claims, 8 Drawing Sheets

(56) References Cited

U.S. PATENT DOCUMENTS

| | | |
|---|---|---|
| 8,365,262 B2 | 1/2013 | Lu et al. |
| 8,396,452 B1 | 3/2013 | Matsuoka |
| 8,526,686 B2 | 9/2013 | Gavita |
| 8,660,322 B2 | 2/2014 | Tsai et al. |
| 8,737,696 B2 | 5/2014 | Gu et al. |
| 8,792,679 B2 | 7/2014 | Sengupta et al. |
| 9,208,177 B2 | 12/2015 | Petrou et al. |
| 9,419,982 B2 | 8/2016 | Matsuoka |
| 2008/0028230 A1* | 1/2008 | Shatford ............... H04L 9/3231 713/186 |
| 2009/0055923 A1 | 2/2009 | Huang et al. |
| 2012/0321143 A1 | 12/2012 | Krupka et al. |
| 2013/0104205 A1 | 4/2013 | Hsi |
| 2013/0114865 A1 | 5/2013 | Azar et al. |
| 2013/0198836 A1 | 8/2013 | Wuellner et al. |
| 2013/0231954 A1* | 9/2013 | Bryant .................... G06F 21/32 705/3 |
| 2013/0236070 A1 | 9/2013 | Sliwinski |
| 2013/0276007 A1 | 10/2013 | Li et al. |
| 2014/0020091 A1 | 1/2014 | Pasquero |
| 2014/0026157 A1 | 1/2014 | Wang et al. |
| 2014/0241574 A1 | 8/2014 | Wang et al. |

\* cited by examiner

SYSTEM AND METHOD IDENTIFYING A USER TO AN ASSOCIATED DEVICE

CROSS-REFERENCE TO RELATED APPLICATIONS

The present non-provisional application claims the benefit of a commonly assigned provisional application having Ser. No. 62/111,325, filed on Feb. 3, 2015 and entitled METHOD OF IDENTIFYING A USER TO A DEVICE, which application is incorporated herein by reference in its entirety.

BACKGROUND OF THE INVENTION

1. Field of the Invention

The present invention is in the field of electronic security and pertains particularly to methods and apparatus for protecting use of a target device or a mechanism or mechanical system associated therewith from unauthorized use.

2. Discussion of the State of the Art

The art of electronic security involves a myriad of differing schema for identifying authorized personnel to use or operate specified computing or communications devices, mechanical devices such as locks or lock systems, and so on. In a basic example of a protected computer, an authorized user must log-in to the computer authorization screen using a password known only to the user and or a personal identification number (PIN). This type of security s deemed weak and is generally inconvenient for a user requiring typing and memorization of a user name, password or PIN, for example.

More recently, biometric security systems have been developed that use face recognition, finger print recognition, corneal recognition, or voice recognition to validate that an authorized user is requesting access to the protected device. Some devices such as some smart phones contain motion sensors such as a gyroscopic sensor and a biometric scanner or camera for face recognition however it may be difficult for a user picking up the phone and then getting a correct angle for face recognition. Further there may be a sufficient lag time after the user attempts authentication and before the phone authenticates the user.

The above-described systems are not wholly economical in the sense that a monitoring capability must be used to detect when a user is ready to authenticate. For example, a laptop protected from access by a face recognition program may be let in a state of "pre-recognition" whereby some power is expended by the device looking for a face to recognize. This may be true of other single biometric detection apparatus integrated into a protected device as well such as a scanner or recorder.

Therefore, what is clearly needed is a two-part or factor authentication process that improves security without adding complexity and that reduces power requirements.

BRIEF SUMMARY OF THE INVENTION

The present system and method solves the problems of the prior art by enabling the automatic detection and identification of authorized users within proximity of a computing apparatus (such as a smart phone or laptop computer) and, after verifying through biometric detection and analysis that the proximate user is indeed authorized to access a particular target (for example a website or other protected files), automatically logging that user into the target or otherwise providing authorized access to those protected materials. The target is generally a computing apparatus (such as a laptop or smart phone) and in some embodiments may be a lock or other protective device including or having computing apparatus capabilities (such as processor, receiver, input device etc.) The target in such instances might provide the user with access to a file stored on the computing apparatus, logon to a website which the target accesses via communications network, or otherwise open a lock or provide the user with access to other restricted environments connected with the target. In some embodiments, the system and method provides the proximate and authorized user access to targets such as, for example, locks on doors which themselves don't have the ability to verify the identity of an authorized user. Such targets may require a key or key in code, but there is no method of verifying through biometric detection that the user carrying the key or inputting the code is authorized to open the lock. In some embodiments a target may allow the user access to another target.

In summary, the invention is an authentication system comprising a computer appliance target requiring authentication of a user in order to access the target, including software stored on and executing from the target, a biometric input device, and a transceiver enabling short-range wireless communication with other wireless capable devices; a database accessible to the target; and a beacon device associated with the user, including at least a transceiver and a locally stored encrypted identity token associating the device with the identity of the user; wherein the transceiver on the target periodically scans for the beacon device within the short-range, and upon detection, establishes communication with the beacon device and requests the identity token, the beacon device receives the request and sends the identity token back to the target which decrypts and validates the token by comparing token data with stored token data in the database and upon successful decryption and validation of the identity token, the software initializes a biometric test input to positively identify the user in possession of the beacon, wherein the software of the target attempts to match the biometric input with second biometric input of the user stored in the database and upon a successful match, unlocks the target and allows the user to operate the target.

In one embodiment of the inventive system and method, a computerized appliance target periodically re-validates the user by repeating the token exchange and biometric input during operation by the user, and upon failure, locks the user out of the target. In another embodiment, the biometric input device enables any one of facial detection, fingerprint scanning, or corneal recognition. In another embodiment, the biometric input device is a camera enabling the facial detection and capture of an image of the user's face and the software compares the captured image with a second image of the user's face previously associated with the user and stored in the database and upon successful match of the captured image with the second image unlocks the target for operation by the user. In another embodiment, additional security step includes requiring input of a password or personal identification number (PIN) by the user. In another embodiment, after beacon detection, a timer function at the target begins a predetermined countdown to end, within which time the biometric test of the user must be detected and verified, or authentication terminates and the system continues beacon detection. In another embodiment, a time code is implemented in the encrypted token which tracks time passed since the last synchronization between the beacon and the target. In another embodiment, the beacon is detected by the target for the first time, the time code is set to zero and a predetermined timing constraint is applied by the target for a beacon to be detected and validated.

The present system and method accomplishes the above by a combination of biometric detection capability (such as face recognition) contained within a computing apparatus such as a laptop, smart phone or other computing apparatus in connection with a target to be opened (for example, a website to be logged into or a lock to be opened) along with a beacon device that may be easily carried, worn or kept in the pocket of the authorized user. The beacon device is detected by the computing apparatus when the user comes into proximity with the computing apparatus. The computing apparatus then runs the biometric or accepts other verification input (such as passwords) to verify that the user is authorized to access the target and then provides automatic access to the target. While approaches other than face detection may be used to identify an authorized user—for example, by using another form of biometric detection such as fingerprints or corneal readers or by use of password input—face recognition may be preferred approach because it does not require the user to do anything other than look into a camera and because cameras come as standard equipment on a variety of smart phones, laptops and other computing apparatus thus creating no additional cost. In some embodiments, it is appropriate to require two separate biometric tests of a biometric test plus an additional input (such as a password) before the user is allowed access to a target.

Importantly, the system and method provides for determination of level of confidence that the beacon is held by an authorized user. This level of confidence is determined by the strength of the biometric test (for example, the level of face recognition), which confidence decays over time. For example, the system and method may require a higher level of face recognition when the user is initially allowed access to the target (for example, when the user first logs on) than at a later time (for example, after 5 minutes of use). The level of security demanded by the system to provide access, or maintain access, to the target is determined, at least in part, by the level of confidence that the user is in fact the authorized user which is affected by a variety of factors (including but not limited to sustained proximity to the computing apparatus). If the level of confidence is low (for example, his is the first instance when the user is attempting to access the target), the level of security verification (for example, the type of biometric verification required) may be higher or more stringent. If the level of confidence is high (for example the user has been accessing the target consistently for a period of time or the user provides additional verification such as passwords), the system may not require a stringent reverification of biometric in order to same time and resources. The level of confidence may also be determined by other factors, for example the level of stringency of the verification itself. If a verification (for example face recognition) determines that the user is authorized the confidence level may be determined as high enough to allow a less stringent test (for example, password or some lesser degree of face recognition matching) to take place within some period of time to insure that the authorized user is the user who is continuing to access the target.

In typical embodiments of the system and method, the step of unlocking the target device requires the beacon and proximity of the user to the computing device as determined by a biometric reading and/or other input (such as a password input). The confidence that beacon is held by an authorized user can act as a substitute for biometric recognition in determining a desired level of authentication has been met to allow the holder of the beacon access to the target, thus saving power and increasing convenience. For example the beacon which (for whatever reason) can only be held by a specific user may be enough to establish the confidence needed for the system to provide access to the target. In some circumstances, biometric recognition may only be required if confidence has dropped too low.

Again, the system and method allows a device otherwise having little ability to perform an identity check (such as a door lock which requires only a key to open it) to demand an identify check by another device (such as a smart phone). The system and method may be used to enable a door lock to require a separate computing device (such as a smart phone) to complete an identity check using face recognition and other methods before it will open.

DETAILED DESCRIPTION OF THE INVENTION

The inventor provides a unique authentication process for accessing a protected appliance or device. The present invention is described in enabling detail using the following examples, which may describe more than one relevant embodiment falling within the scope of the present invention.

Figure 1:
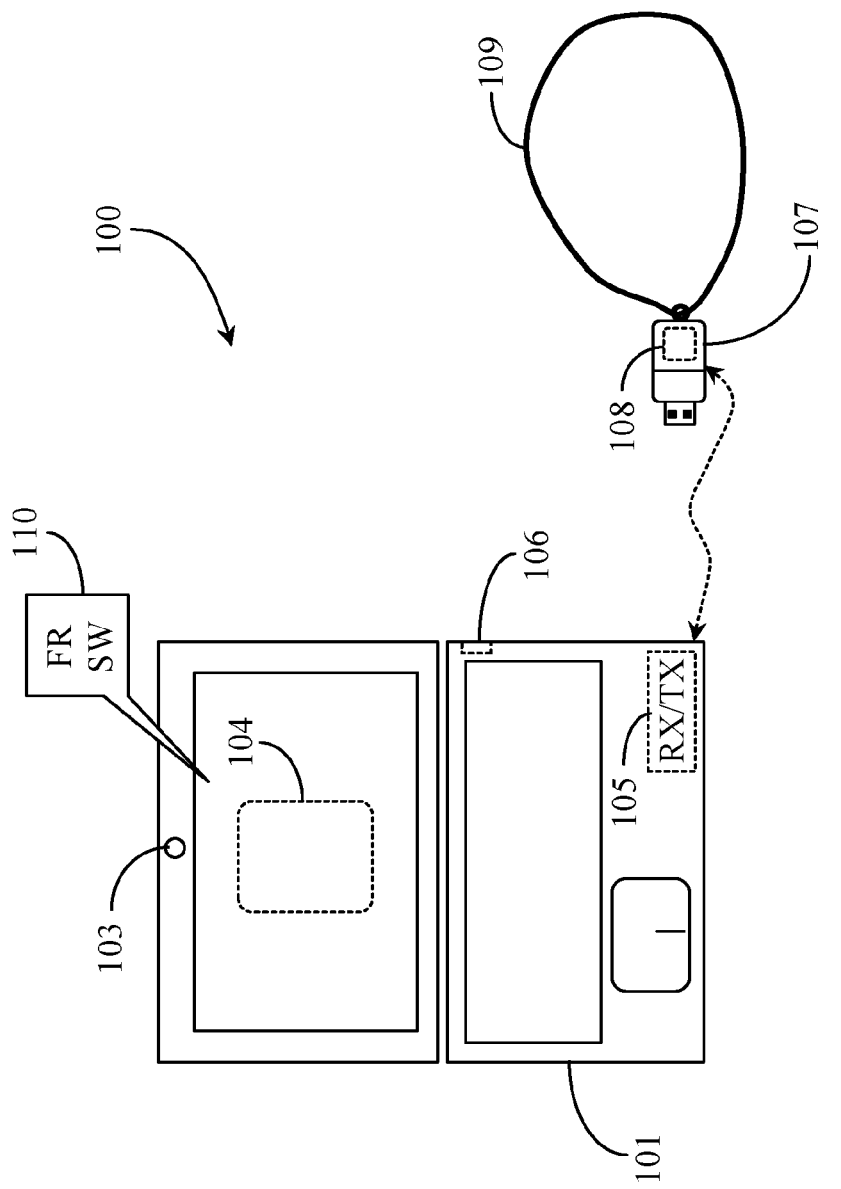
FIG. 1 is a front elevation view of an authentication system supporting detection of a beacon and biometric authentication of an authorized user of the beacon according to an embodiment of the present invention.

FIG. 1 is a front elevation view of an authentication system 100 supporting detection of a beacon and biometric authentication of a principal owner of the beacon according to an embodiment of the present invention. System 100 includes a computing appliance 101 that may also be referred to hereinafter in this specification as a target appliance. The term target appliance (or device) refers to any computing appliance or device that is the "target" for access by a principal user, more particularity a security protected device or appliance that is "locked" to unauthorized users. The target is, in essence, any device having 1) a way to detect and talk with a beacon device, 2) having the ability to match a biometric with another held in a database, and 3) is capable of allowing selective access to otherwise secured assets (such as files, websites, locked premises, etc.). In some embodiments, the computing apparatus provides the ability to verify the user's authority to access another target such as a website or lock and works to allow such access (log in the user or open the lock) once the user's authority has been identified. The term "principal" may refer to any person or user who is authorized to log-in to access a particular system, device, website, or otherwise protected file or file set.

In FIG. 1, computing appliance 101 is a laptop but may alternatively be one of a variety of other types of appliances such an iPhone, an android device, or some other computing appliance that is otherwise locked out to any user who is not authorized to access the computing appliance. In one embodiment, a target device is not necessarily a computing appliance in the sense that it is capable of multitasking. The computing appliance (for example a laptop) may be capable of multitasking itself or my be available to a variety of users but certain profiles, websites, applications and other capabilities will be made available to only authorized users. In one embodiment device 101 may be a dedicated device that performs one or a few tasks without departing from the spirit and scope of the present invention.

The terms appliance and device may be used synonymously in this specification wherein appliance refers to multitasking capabilities such as in computing and wherein device refers to a more dedicated target relative to task performance. It is duly noted herein that a minimum requirement of capability for a device or appliance is that it is capable of wireless commination with another wireless device or appliance and is capable of storing some data.

Computing appliance 101 includes facial recognition software (FRSW) 110 for enabling facial recognition of one or more than one user who may be authenticated to access laptop 101. Facial recognition is aided in this implementation by a camera 103. Appliance 101 includes a Universal Serial Bus (USB) port 106. In one implementation, the wireless commination protocol used to communicate with other wireless devices in Bluetooth™ technology. While this is not a limitation of the present invention as other wireless communication protocols might be used such as infrared or wireless USB without departing from the spirit and scope of the present invention. In one implementation, wireless communication capability is built into or integrated within appliance 101.

In another implementation, wireless communications capability may be added by inserting a peripheral device or "communications" card into a suitable port on appliance 101 the device operating as a peripheral without departing from the spirit and scope of the present invention Bluetooth™ is a preferred wireless communications protocol in this embodiment because of its wide availability in appliances and devices and because of its shorter communications range dynamics and device detection capability. An important aspect of the invention is that the authorization of the principal to access the target requires the proximity of the user to the target in order to complete and maintain the verification and authorization of the principal to access the target. Active wireless connection is depicted herein by a broken double arrow between the communicating components.

In this embodiment, appliance 101 is capable of wireless communication using Bluetooth™ with another device or appliance. Appliance 101 includes a wireless transceiver (RX/TX) 105 for receiving and sending communication to other wireless devices or appliances. System 100 includes a wireless communications device 107 referred to hereinafter in this specification as a "beacon" device. Device 107 is enabled for Bluetooth™ wireless communication in this implementation via a battery powered wireless chip package 108 that may include wireless communications chip (WC) supporting a transceiver (RX/X) and a memory for storing data received and data to be sent from the device.

Device 107 is in the form of a USB device modified to include wireless communications capability. Device 107 may be carried by a user who has authorization to access and open laptop 101. In this implementation, the device may have a lanyard 109 attached fir wearing about the neck or on a wrist, or from a belt loop etc. It is not required that beacon 107 is USB enabled in order to practice the present invention. USB capability simply provides another way to communicate with the appliance 101 (which in this example is a laptop). In an alternative embodiment, device 107 may be a smart watch, or some other form of wearable wireless device that may be detected by appliance 101 when brought into wireless communications range of the appliance laptop.

In general use of the invention in this implementation, a user that may be the principal owner and operator of appliance 101 and of beacon 107 must perform at least two separate authentication procedures in order to have unfettered access to laptop 101. A first procedure may occur when the principal brings device or beacon 107 within communication range of appliance 101, typically within a few feet from the appliance. Appliance 101 is assumed to be in a low power state such as in a "locked" sleep mode. In this mode appliance 101 may periodically scan for beacon 107 from this low power state.

When beacon 107 is brought into detectable range of the appliance, the appliance may recognize the beacon owing to existing Bluetooth™ technology known to the inventor and those with skill in the art of Bluetooth™ technology. Beacon device 107 is "paired" with appliance 101 prior to first use or at first use of the authentication process by the principal so that the beacon may be recognized as an authorized device controlled by the principal user. Such pairing can also be described a "associating" the user with the beacon device.

It is noted herein that the term principal as used in this specification refers to an authorized user of the computing appliance (laptop in this case) and of the beacon device. In some cases, the principal user will be the owner of both appliance and beacon and is the only authorized user of both. However, it is also possible that more than one user may be authorized to access appliance 101 and beacon 107 in a shared computing embodiment. A wireless network may provide for use of multiplicity of beacons, for example with a Piconet (enabling the use of eight devices). There may be other numbers of devices enabled relative to other wireless communications protocols that night be used wherein that number may be greater or smaller than eight devices without departing from the spirit and scope of the present invention. It should be noted that while it is possible to share a beacon between principal, such sharing is made at the expense of lowering security. For example, if a beacon device should be associated with a multiplicity of principal, the biometric test would look for person A or person B and would therefore be the only way of differentiating between A and B. In other words, the security then become a singe factor within the group sharing the beacon.

Beacon 107 may or may not include an on/off power switch (not illustrated). When beacon 107 is powered on it emits a periodic signal that may be detected by appliance 101 when it is in "detection range" of the laptop wireless transceiver 105. Appliance 101 is in a low power state where only the wireless device detection capability is running. This capability may be timed to run for a few to several seconds periodically to determine if any authorized beacons are in communications range of the appliance.

When beacon 107 is detected by appliance 101, the laptop may request an identity token (not illustrated) from the beacon device. An identity token may consist of a device code or "beacon" code and a time code quantifying the amount of time since the principal has last accessed the appliance using the authentication method of the invention. Every wireless Bluetooth™ device has a unique machine address that helps to differentiate the device from other devices. In this way detection of the beacon incorporates the knowledge that the device is the same device previously paired for detection with the appliance. The token sent in encrypted format may be decrypted on appliance 101 to validate or confirm that the device is in fact the original beacon configured by the principal or an agent thereof to be detected by the appliance.

After appliance 101 has detected and requested a token from the beacon device, the token is decrypted and the beacon is validated. After validating the beacon device 107, facial recognition SW 110 is launched in anticipation of the principal passing a second authentication test to validate that it is indeed the principal user who brought the beacon device into range of the appliance. In a preferred implementation a timing function (not illustrated) is incorporated into the process so that the principal user has only a specific amount of time to pass a biometric screening or test to positively identify the principal user and owner of the beacon.

In this implementation, appliance 101 uses facial recognition to confirm user identity. However, another biometric recognition process may be substituted therefor such as a fingerprint scanning program and apparatus or a corneal recognition program. In one implementation a separate identity test may be a typed password or personal identification number (PIN). An identity test for a correct principal may be hosted on and executed from a target or by a device that is in a state of communication with the target such as a peripheral device connected to the target. More than one principal may be authorized to access a target device and therefore biometric test preparations may be required before a biometric test will work. One with skill in the arts of biometric testing of individuals will appreciate the need, for example in face recognition, to have a sample or comparison facial image for each principal user stored for comparison on the target device. Other biometric programs that might be used may have different requirements in a set up process before they will operate correctly.

In an alternative embodiment, the target system may be trained according to beacons that are "known" (verified identity history) to the system using facial recognition such that the images taken by the target of principals associated with the known beacons may be used to train the facial recognition software to recognize the principals. Considerable reduction in power consumption may result from reducing the number of images of the principals that the system must select from (i.e. the number of principal users the system is trained to recognize). In an alternative embodiment, the target system can effectively update or "refresh" the biometric information held in database and matched with the biometric information received at the time of detection of the beacon. For example, once verification of a received biometric (such as a photo of the user's face) is verified by the system as being a match with biometric information previously held in a database, the newly received biometric information can be stored on the database to replace or update the biometric held in storage. This not only allows an additional level of security (by updating the image to be matched) but allows the system to more effective in that is track changes (the user growing a beard for example) which might affect the ability of the user to access the system.

After beacon detection, the timer function begins countdown to end, within which time it is expected that an additional biometric of the principal will be detected and verified. In the example shown, a fresh picture of the principal is taken and compared to a facial recognition image of the principal previously stored on the laptop. The camera and SW take a certain amount of the time afforded by the timing function to be ready for taking a fresh image depicted herein as image 104, and validating the image. The process of taking image 104 and validating image 104 as that of the principal may use more time than is allotted by the timer in which case the process restarts as shown by the figure. It should be appreciated that the requirement that the system take a biometric reading of the user within a time frame commenced from the time the beacon is detected insures the proximity of the user to the target.

If the principal does not provide a timely response after token validation (for example the user fails to position him/herself in front of the camera), the system may run out of time and may then abort the two-part authentication process without completely validating the principal's identity. Thus the principal may be required to start over after some specific delay period. In one implementation, the system may update the facial recognition image of the principal with fresh image 104 to evolve along with the natural changes of the principal's face over time. In one implementation, the timing function may be shortened or lengthened according to a degree of confidence that the carrier of the beacon is in fact the correct principal user.

Beacon detection may be practiced in a low power state of the target device conserving energy. Furthermore, the two-part process is timed to be immediately responsive according to presence of the beacon and the principal both raising confidence level toward better security and also conserving energy.

Figure 2:
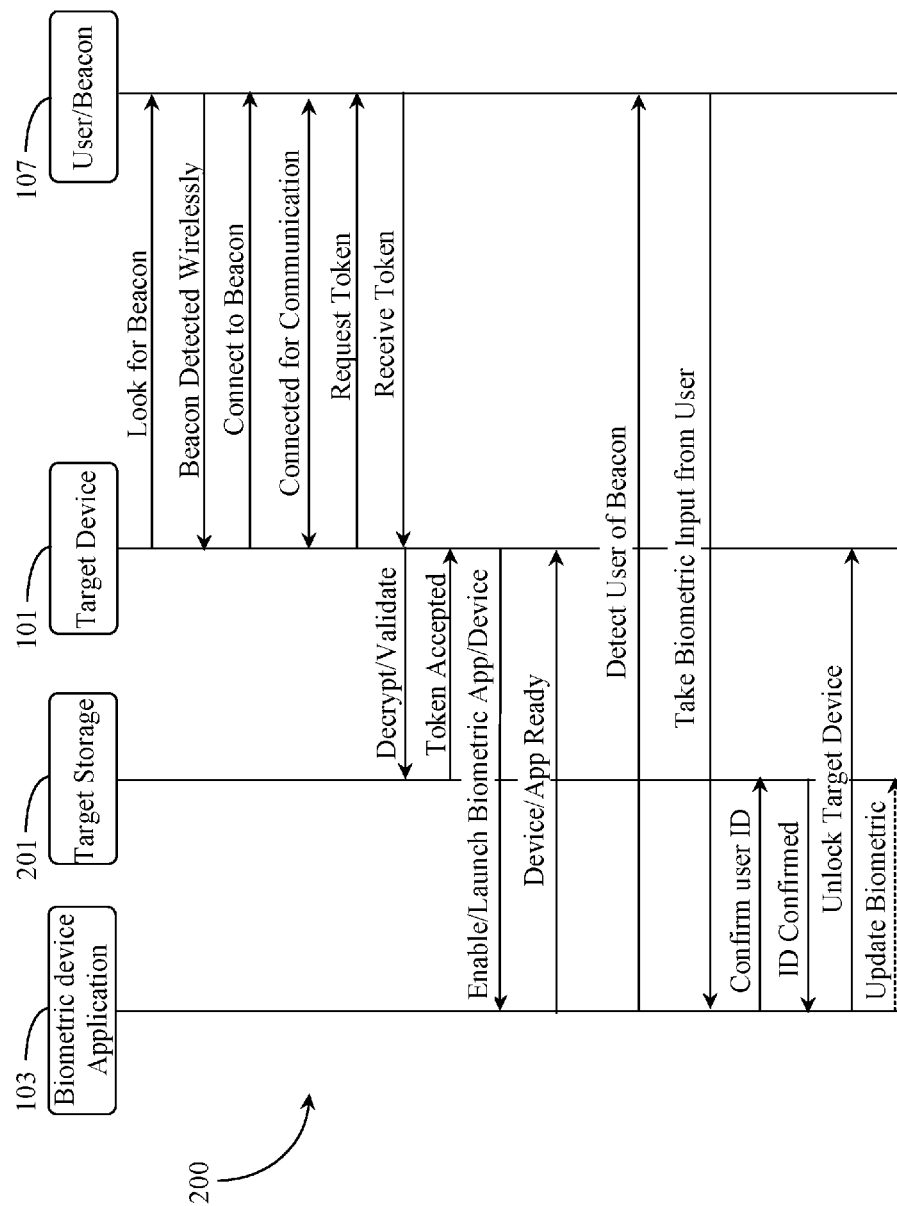
FIG. 2 is a sequence diagram depicting interaction between components of the authentication system of FIG. 1.

FIG. 2 is a sequence diagram 200 depicting interaction between components of the authentication system of FIG. 1. Sequence 200 begins on target device 101 wherein the target scans for a beacon such as beacon 107. Beacon 107 is detected wirelessly by target device 101. Target device 101 then connects to beacon 107 for communications. Target device 101 requests a token of beacon 107 and beacon 107 passes the requested token to the target device in encrypted format. Target device 101 looks up the key in a database in order to decrypt the token or tries decrypting the token with all of its available keys. After decrypting the token is assumed accepted in this sequence.

After validating the token, target device 101 enables launch and run of a biometric recognition application and apparatus 103. In the case of FIG. 1, it is facial recognition of a fresh photo wherein the photo taken is matched with a similar photo held in storage 201 of target device 101. Biometric device 103, in this case a camera with supporting software, reports back that it is ready to take input from the principal user (picture). Time constraints are not illustrated in this sequence for basic clarity of the sequence. It is also assumed herein that the two-part authentication is successful whereby the token and facial recognition processes are executed without flaw.

After reporting ready, biometric application and apparatus 103 detects the principal user associated with the beacon for example by using its camera to take a picture of the field of view in front of the apparatus where the principal is likely to be standing detecting facial characteristics within the photo taken and comparing those facial characteristics with the facial characteristics of an associated principal user. In an alternative example, apparatus 103 detects the presence of the principal user using some other sensing device to determine that an individual is indeed standing within the field of view of the camera before it takes the photo. In the example, the apparatus (camera) 103 takes a fresh photo of the principal user and the facial recognition software attempts to match it with an older photo of the principal user's face that is stored in target storage 201 such as a hard drive or the like. The facial recognition application confirms the identity of the principal user and acts to unlock the target device or appliance for user access. As noted above, some embodiments allow for the system to refresh the image held in database by replacing the old photo with the new photo once the principal has been verified and the user is provided access.

Figure 3:
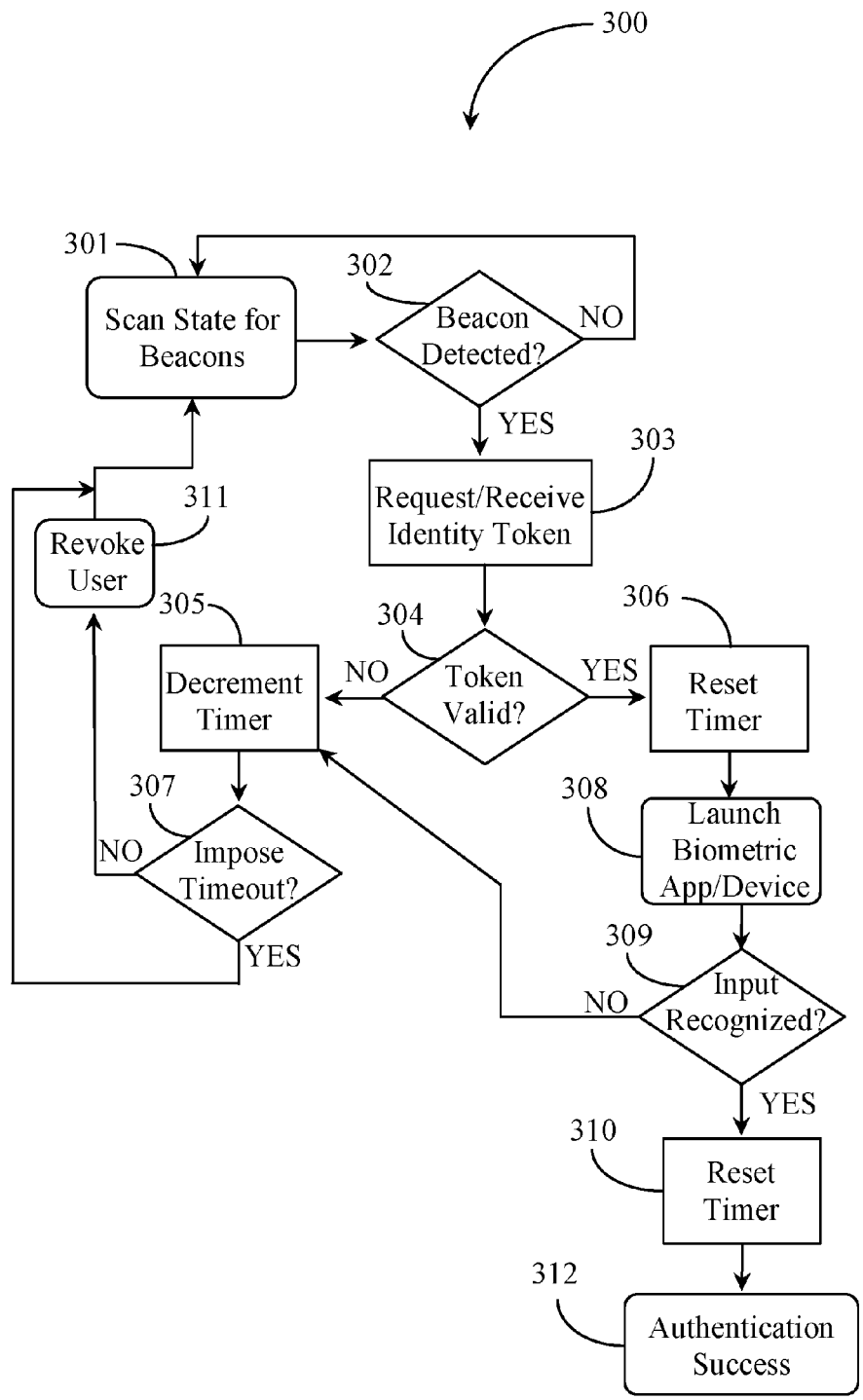
FIG. 3 is a process flow chart depicting steps for detecting an authorized user at a protected device and authenticating the user within a time constraint according to an aspect of the present invention.

FIG. 3 is a process flow chart 300 depicting steps for detecting an authorized user at a target device and authenticating the user within a time constraint according to an aspect of the present invention. At step 301, the appliance regarded as the "target" is assumed in a state of scan for beacons. At step 302, it is determined during the scan period whether any beacons were detected. If no beacons were detected at step 302, the process may resolve back to the scan state at step 301 perhaps after some delay period between scanning periods. It is noted that scanning for beacons may not be a continuous state to conserve energy.

If a beacon is detected at step 302, the target may request and receive an identity token from the detected beacon. In actual practice there may be a handshake between devices (target, beacon) before they are connected for communication. In one implementation, the target may, when detecting a beacon, see its MAC address and look it up to determine if it should be ignored. It is noted herein that the beacon may have to be previously paired with the target before it may be recognized for connection and request.

At step 304, the target may determine whether or not the token received from the beacon is valid. Validating a token requires decryption of the token and "look up" of the decrypted information in storage. The encrypted data or token may include a beacon identity code or "beacon" code and a time code. The time code may be a measure or accounting of time passed since the last synchronization between the beacon and target. If the beacon is detected for the first time, the time code may be set to zero. In this implementation a timing constraint is applied by the target relative to how much time is allotted for a beacon to be detected and validated.

In this implementation, a timer function is provided, the timer starting with a specified amount of time allowing for beacon detection, token exchange, and token validation. The amount put on such a timer may vary according to current overall confidence level of the system that the beacon is being used by the correct principal user. If it is determined in step 304 that the token received is not valid, the target may decrement (shorten) the timer at step 305 due to a lower level of overall confidence that the beacon is legitimate. Optionally, the target may determine whether to impose a time out period at step 307 where the target remains locked until the principal user brings the beacon back into range for another attempt. It may be that the beacon was not close enough to the target or the token was not fully discerned during a communication error.

If at step 307 the target determines to impose a time out period, the process may resolve back to step 301, where the target will again scan attempting to detect the user's beacon. If the target determines not to impose a time out period for a retry attempt at step 307, it may revoke the principal user from accessing the target at least by way of a beacon at step 311. In this case, control logic may determine that another device has attempted to impersonate an authorized beacon device due to the invalid token data. In such a case, there may be a procedure that requires another more stringent type of authentication such as a pass code known only to the principal user for allowing the principal user to still access the target in order to re "pair" the beacon device with the target device perhaps creating new token data and perhaps deleting the old data from the target-accessible storage device (reconfiguration of target to beacon). In one implementation where a target is an appliance shared by more than one principal user, the process may resolve back to scan state 301 after revoking privileges of any other principal user.

If the target determines at step 304 that the token received from the detected beacon is valid, the target may reset the timing function at step 306 with a specified amount of time allotted for biometric identification and confirmation of biometric match. At step 308, the target may launch a biometric application and supporting device such as a camera (supporting device) and a face recognition software application (biometric application) analogous to SW 110 of FIG. 1. Steps 306 and 308 may be performed simultaneously without departing from the spirit and scope of the present invention. During this step, the user may be required to "position" in a certain way such as directly in front of the camera. The biometric SW may report a ready state when it is ready to snap a picture of the principal user.

At step 309 the target may determine if the fresh input (photo snapped of principal user) is recognized as a valid facial representation of the principal user. If at step 309, the input is not recognized during matching of the photo taken to one held in storage, the process may resolve back to step 305 where the target may decrement a timer function specifying the amount of time allotted for biometric launch, user input, and confirmation of the user identity. Decrementing the timer occurs when the overall system confidence level that the principal user is carrying the valid beacon has diminished due to the input not being recognized. The process may resolve back to step 307 where the target may determine to impose a timeout period at step 307.

If the target determines not to impose a timeout period at step 307, then the target may revoke the user's privilege at step 311. The process may then loop back to step 301 to scan for beacons. It is repeated here that if a principal user's privileges are revoked because the facial recognition test failed it might mean that an imposter attempted to access the target with the user's valid beacon but filed the biometric test. It may also be that the principal failed the biometric test due to an error made during the test. As described further above relative to beacon confirmation, the target may have another access regimen for the principal using an authentication procedure known only to the principal so as to bypass beacon and biometric identity confirmation by the target. In this way a target locked due to error or hack attempt may still be accessed by the real principal user to reconfigure a beacon and or biometric test parameters.

Referring back to step 309, if the biometric input is recognized as the biometric input of the principal user, the timer function may be reset for the same amount at step 310. It is noted herein that a timer function may be preset with an amount of time to "count down" to zero, or it may be reset to zero and "count up" to a preset amount of time without departing from the spirit and scope of the present invention.

At step 312 the target reports authentication success and the principal user may have unfettered access to the target or a portion of the target based on permissions held by the user.

It is duly noted herein that a target appliance may be a shared appliance that is shared by a number of principal users. The amount of principal users that may share a target appliance may depend in part on the wireless protocol used for the beacon communications. Moreover, a target appliance may be partitioned wherein certain files and data accessible through the target are protected for different principal users. In another embodiment, a target appliance may be a dedicated component such as a lock, a dedicated physical barrier, or a computerized gateway to information or to another protected data system for example.

In one embodiment, a principal user with a single beacon may be authorized, given a successful association with one target, be subsequently authorized to access a number of subsequent target appliances or systems, but may only have to authenticate using the two-factor test (beacon validation and biometric test) at one target such as one placed at a security entrance where the subsequent target devices are networked to the first device.

In the above case a server may be involved that may determine, in near real time and after a first authentication of the principal using the two-part test, which of the networked target appliances shall be accessible to the principal user. In such case only the beacon confirmation being performed at each instance of attempted access such as when the principal comes in range of the authorized target associated to the principal by the server controlling the target assignments. An example may be a work example where the principal shows up and authenticates at a first target using a beacon and biometric test and then has a "known" beacon access to a number of other target systems such as a number of different but networked computers for the rest of the work period. In this case the beacon access simply depends upon the target recognizing the beacon and matching it with history of the same beacon associated with the same principal logged into the system by the first target. In a variation of this embodiment, the subsequent targets may request token identity and validate the beacon when it is in range enabling automatic login of the principal to those targets without asking for more biometric data.

Figure 4:
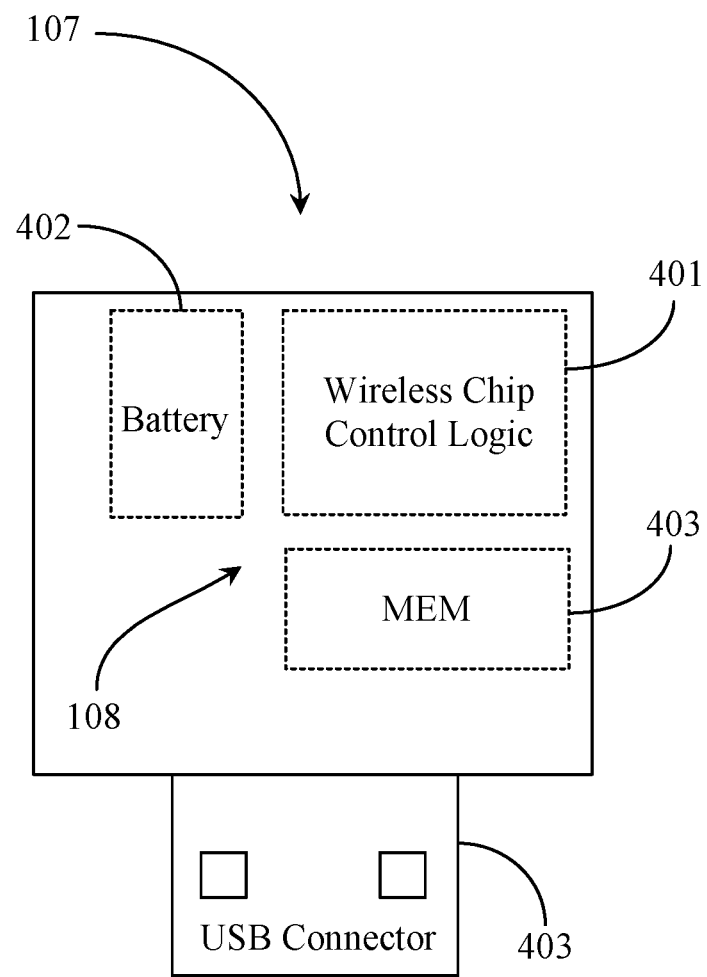
FIG. 4 is a block diagram depicting a beacon device having a Universal Serial Bus connector according to an embodiment of the invention.

FIG. 4 is a block diagram depicting beacon device 107 of FIG. 1 having a Universal Serial Bus connector according to an embodiment of the invention. Beacon 107 doubles as a USB device in this embodiment. Package 108 includes a battery 402 that may be rechargeable. Beacon 107 includes a wireless chip and control logic 401, and a memory (MEM) 403 to hold data. Control logic may be firmware or a small SW routine for managing data on the device and communications according to the wireless protocol used.

Beacon 107 includes a USB connector plug 403, which may be inserted into a USB port on the target appliance if there is one. In one embodiment, beacon 107 may be detected wirelessly prompting a target to request a token from the device wherein the device is inserted into a USB port on the target appliance to "pass" the token data to the target in an auto-syncing embodiment that may be previously configured as a primary state or as an optional secondary state of communication between the principal user and the target.

In order for USB to be active (USB device recognition and file transfer) on a target appliance, the target may be required in some implementations to be "accessible" past a certain operational stage such as boot and discovery of ports and services, for example. USB device recognition is typically not active on a computing appliance unless some authentication task has already occurred. In one embodiment, wireless recognition of a beacon device may provide enough authentication (for example, the correct beacon machine address) to unlock the target minimally to use USB for passing token data only. After validating the token data, the biometric test may launch while the data and programs of the target appliance are still "protected from access" pending confirmation of the principal during the biometric test. In an alternative embodiment, beacon 107 might be some other type of wireless device with or without USB capability.

Figure 5:
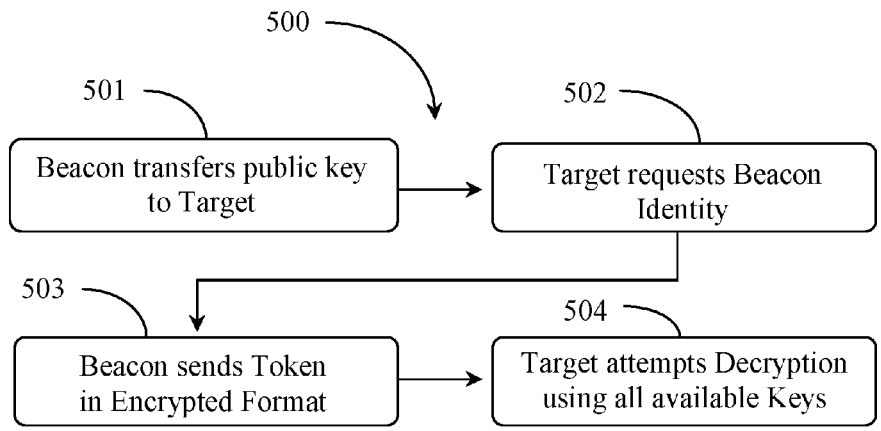
FIG. 5 is a process flow chart depicting steps for token exchange between a target device and a beacon device according to an embodiment of the present invention.

FIG. 5 is a process flow chart 500 depicting steps for token exchange between a target device and a beacon device according to an embodiment of the present invention. As described further above, token data including a beacon identification code or "beacon code" and a time code quantifying the amount of time that has passed since a last sync between a beacon device and a target appliance or device is encrypted for protection against theft and use to impersonate by some unauthorized device. Therefore, a form of data encryption is used to protect the data on the beacon and in transit from the beacon to the target. Asymmetric or symmetric encryption programs may be used.

One with skill in the art of data encryption and decryption will appreciate that asymmetric encryption and decryption requires two keys (private and public) that are separate but that are mathematically linked to one another. The public key is shared with the target while the private key is held on the beacon in this example. At step 501, a beacon device may transfer a public key used to decrypt data to an associated target appliance. This step may occur during a secure setup operation and after "pairing" the beacon with the target for beacon detection, or at first use of the authentication procedure to give access to the target. A token identification code may be a randomly generated code or it may be a code assigned by the target or created by the principal without departing from the spirit and scope of the present invention. Both the beacon code and time code may be encrypted in one pass using the beacon's private key.

At step 502, the target appliance requests beacon to provide its identity (token). This step is subsequent and occurs after the beacon has been wirelessly detected by the target appliance. At step 503, the beacon sends the token in encrypted format to the target appliance. If more than one principal user has authorization to access the target appliance, there may be a like number of "public" keys stored on the target for use in decrypting the token data. At step 504, the target appliance attempts to decrypt the token using all available pubic keys it has in its possession.

Figure 6:
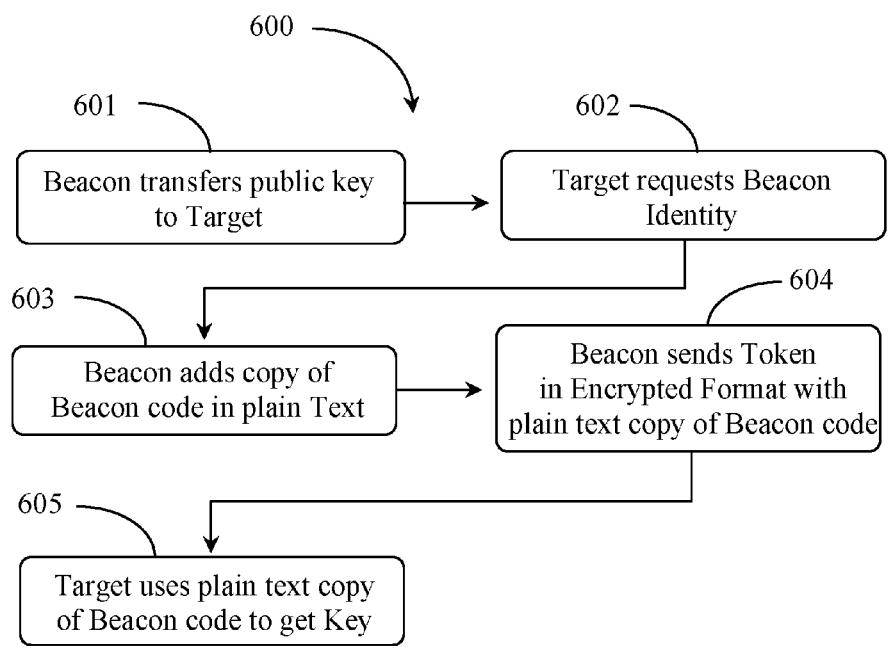
FIG. 6 is a process flow chart depicting steps for token exchange between a target device and a beacon device according to another embodiment of the present invention.

FIG. 6 is a process flow chart 600 depicting steps for token exchange between a target device and a beacon device according to another embodiment of the present invention. At step 601 a beacon transfers its public key to a target appliance. This step is analogous to step 501 of FIG. 5 allowing for asymmetric encryption. At step 602, the target requests the beacon identity after the beacon is detected analogous to step 502 of FIG. 5. At step 603, the beacon adds a copy of the beacon code in plain text (not encrypted) to the encrypted token.

At step 604 the beacon (after detection and request for token) sends the encrypted token and the plain text copy of the encrypted beacon code to the target appliance. At step 605, the target appliance uses the plain text copy of the code to look up the correct public key with which the encrypted token may be decrypted making the process shorter if more than one public key is on the target appliance.

Figure 7:
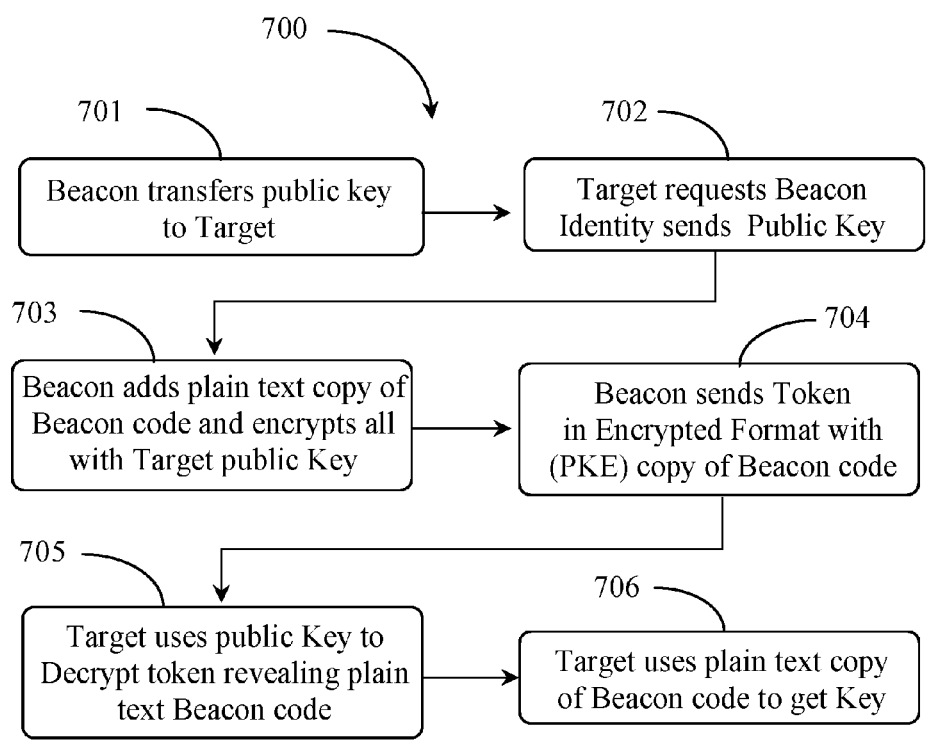
FIG. 7 is a process flow chart depicting steps for token exchange between a target device and a beacon according to another embodiment of the present invention.

FIG. 7 is a process flow chart 700 depicting steps for token exchange between a target device and a beacon according to another embodiment of the present invention. Step 701 is analogous to step 601 of FIG. 1. At step 702 however, the target appliance requests the beacon identity and sends the public key to the beacon in the initial request. At step 703, the beacon adds a plain text copy of the beacon code to the "encrypted token" and additionally encrypts all of the data (encrypted token and plain text copy of beacon code) with the pubic key received in the request for identity at step 702. At step 704, the beacon sends the token data doubly encrypted with the plain text copy encrypted solely with the public key.

At step 705, the target appliance uses the pubic key in a first pass decryption to reveal the text copy of the beacon identity and uses the decrypted copy of the beacon code at step 706 to look up the correct key to decrypt the rest of the token. This added encryption helps prevent a beacon from being tracked by another nearby wireless appliance.

Figure 8:
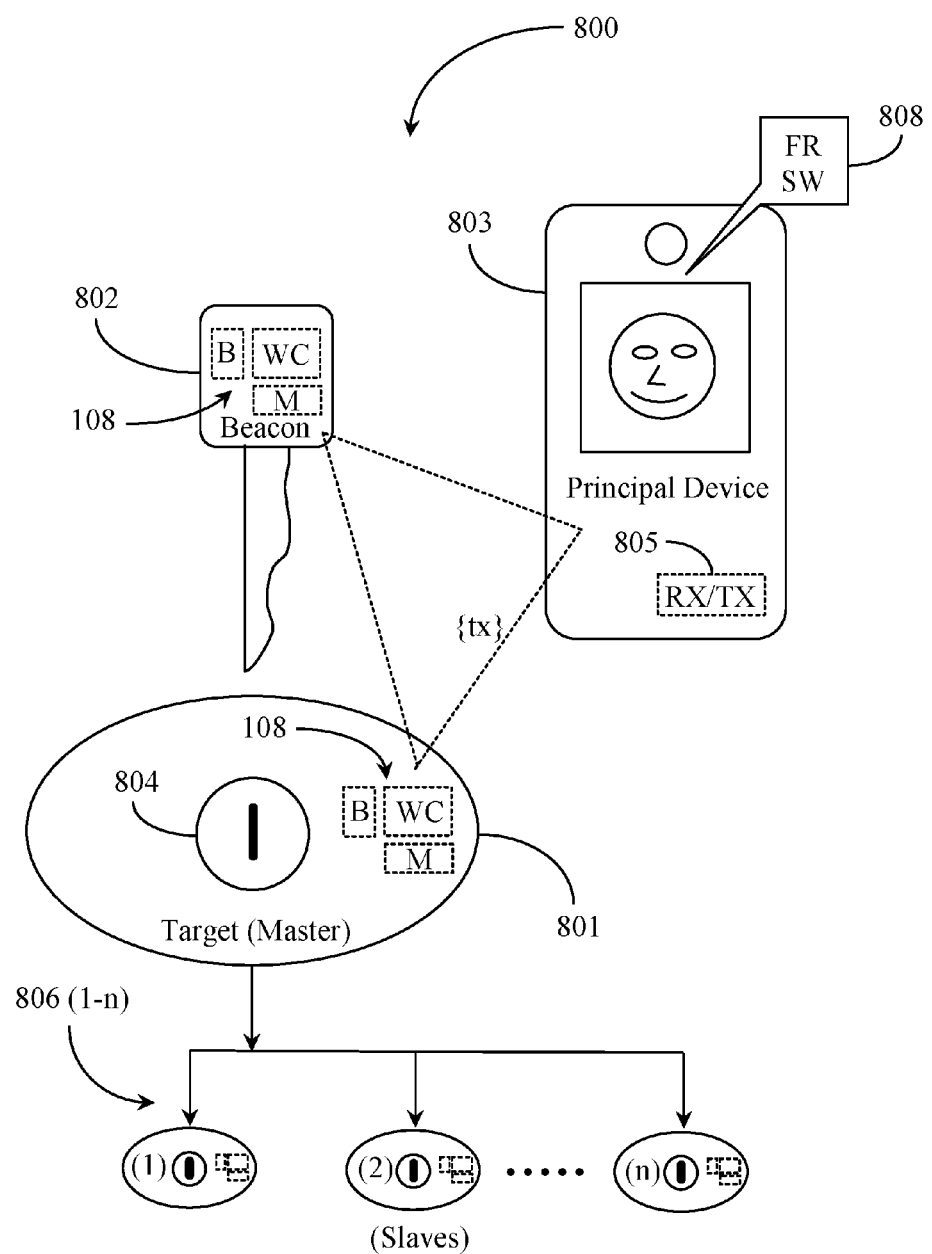
FIG. 8 is block diagram depicting a security system according to another embodiment of the present invention.

FIG. 8 is a block diagram depicting a security system 800 according to another embodiment of the present invention. Security system 800 involves three wireless communications-capable devices depicted herein as a beacon device 802, a task-dedicated target device 801, and a personal computing appliance or device 803 owned and operated by the principal user authorized to access target device 801. In this implementation, target device 801 is a master lock having a key entry mechanism 804 and a wireless communications chip package analogous to package 108 described relative to FIG. 1.

Target device 801 may, in one implementation, control access to one or more "slave locks" 806 (1-n). While not required to practice the invention, if a principal is successful in accessing target device 801, the principal may also have automatic access granted to any additional locks that may be "secondary" to the master. In one example, the master lock may provide access to a front entrance of a home or business while certain ones of the slave locks may provide access to certain other rooms or protected areas or enclosures beyond the entrance.

Target device 801 is a dedicated device with no ability to perform a biometric test. Beacon device 802 is of the form of a "smart key" that may open one or more "smart locks" and is not dependent on mechanics of typical keys that are cut to open one lock having the same pattern built into the locking/unlocking mechanism. Beacon 802 has the minimal wireless package 108 enabling wireless communications with the target device. However, both the beacon and the target are dedicated devices in this example and do not have further capabilities of testing for a biometric signature.

Therefore, a third appliance such as appliance 803 may be required to perform a biometric test in order to confirm that the principal user authorized to access device 801 is the correct user in possession of key 802. A broken triangle illustrates the wireless communications capability of the three devices to communicate wirelessly with one another. Wireless capability on appliance 803 is depicted by a transceiver (RX/TX/805.

When the principal approaches lock 801 and comes into wireless detection range of the lock while the lock is in a scan state for a beacon, beacon 802 may be detected by target 801. Target 801 may request a token from beacon 802 just as in the other examples depicted previously. Beacon 802 may pass the token to the target device in encrypted format using wireless communication. In this case, the target device may be "paired" with the beacon device with the aid of the third device 803, which must also pair with the target device for communications if using Bluetooth™ as the wireless protocol.

Device 801 may have automated routines for looking up keys and decryption of tokens and may be able to select one of more than one automated routine to run based on input but has no complex computational capabilities such as performing a complicated biometric test using software. Therefore, once beacon 802 is validated by master lock 801 as being the correct beacon, it may in some cases require a biometric test be performed on the principal user's personal appliance like smart phone 803. Smart phone 803 has a camera and facial recognition software (FRSW) 808. Whether target 801 requires a biometric confirmation of the principal may be a matter of a current confidence level of the system which may be discerned on device 801 based on event patterns relative to recent use and or known schedules. In this regard, target 801 may be enabled to determine which of two available firmware routines to run based on "event pattern intelligence" once a beacon such as beacon 802 is validated as a correct beacon to unlock the device.

If a level of confidence is high, such as the user always arrives at roughly a same time every afternoon to unlock the target, the target may select a routine that provides access to unlock the target after confirmation of a valid beacon and not requiring facial recognition of the principal. If confidence is lower such as the principal is scheduled to be away but a beacon is detected at an abnormal time, the target device may select a second routine requiring a biometric test to confirm the principal identity before providing access.

In the case of the second routine described immediately above, the principal user may, within an allotted amount of time as determined by a timing function {tx}, take a fresh photo (facial recognition) and wait for confirmation of facial recognition software 808 that is installed on the phone. Taking of a flesh photo insures that no one else has taken the principals device and attempted to impersonate the user. Moreover, the fresh photo may be used to update an older photo currently in file for matching. Once principal identify is confirmed on device 803, a message detailing the confirmation, or failure if that is the case, may be sent wirelessly to target device 801 to allow the principal to insert the beacon and turn locking mechanism 804 providing access to the principal user. In one embodiment the message may include some or all of the token data for verification purposes.

In one implementation, one or more of or all of locks 806 (1-n) may be previously programmed electronically to "unlock" or to allow the beacon to unlock them when and if the target has granted access to the principal. In one implementation the slave locks 806 (1-n) are wired electronically to the master lock. In another implementation, slave locks 806 (1-n) are "wirelessly" connected to the master and are within range for communications. An example might be a passenger door lock (Target) and slave locks (other doors and trunk).

Figure 9:
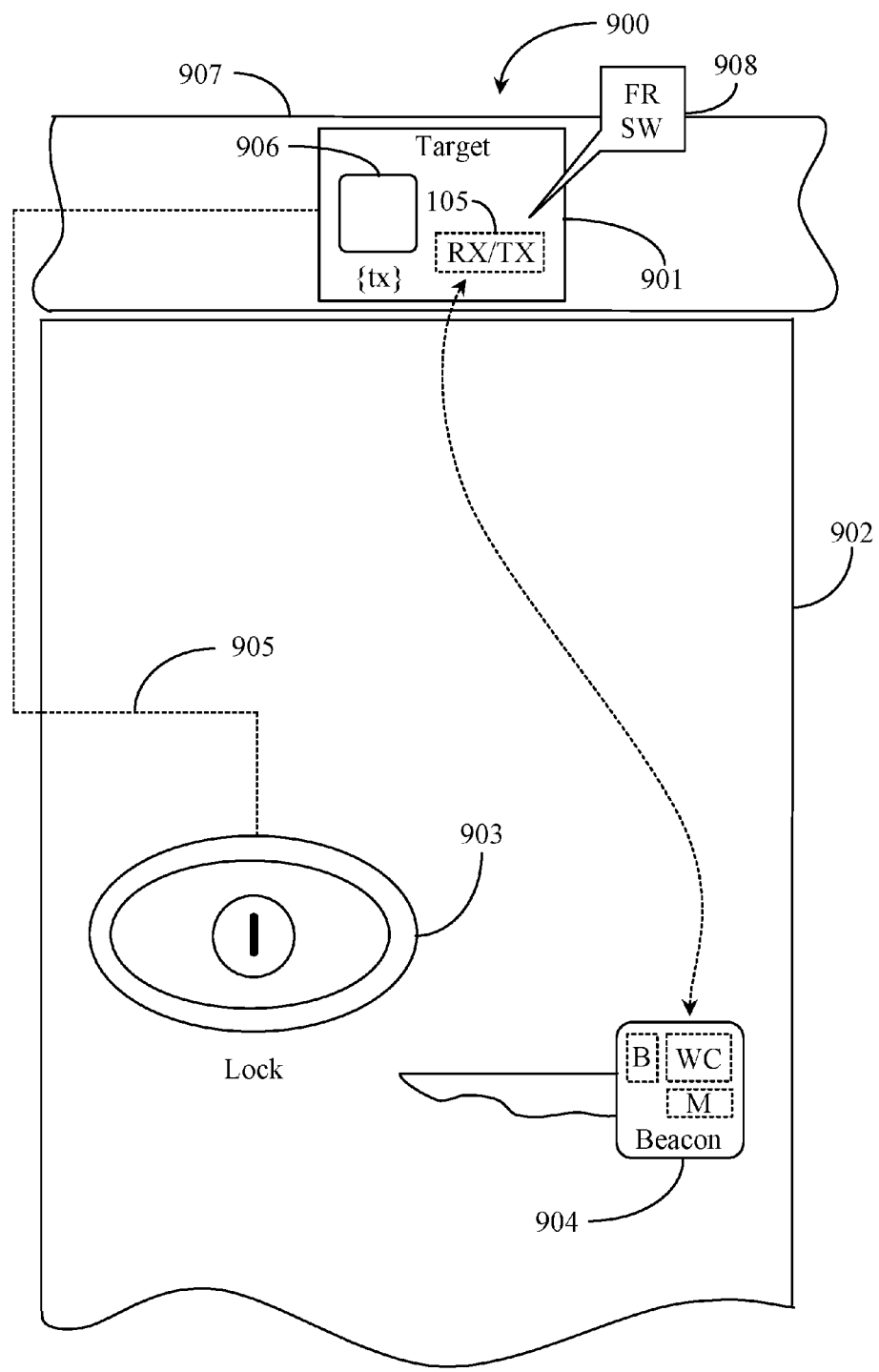
FIG. 9 is a block diagram depicting a security system according to a further embodiment of the present invention.

FIG. 9 is a block diagram depicting a security system 900 according to a further embodiment of the present invention. System 900 includes a lock device 903 that is electronically controlled by a mounted target appliance 901. In this case, lock 903 is a door lock installed on a door 902. Target appliance 901 is a computation-capable appliance mourned to a frame member 907. Target appliance 901 has a facial recognition software (FRSW) 908 installed thereon and executable therefrom. Beacon 904 is of the form of a smart key as previously described relative to key 802 of FIG. 8.

In this example, target device 901 is electronically connected to lock 903 as depicted herein by line connection 905 such that an electronic signal sent from the target to the lock may actuate the lock to unlock or to remain locked. When a principal user approaches target device 901 with beacon 904, it may be detected and the target appliance may request the identity token from the beacon over the wireless connection illustrated by broken arrow. As was described further above relative to system 800, target appliance 901 may determine based on a confidence level intelligence whether to require a facial recognition test of the principal.

In this case the lock is dumb bit electronically controlled by the target appliance. Therefore, key exchange is from the beacon 904 to the target 901 with description and validation of token data carried out on the target appliance. Target appliance 901 may send a signal to enable "unlock" of lock 903 after validating that beacon 904 is correct if confidence level is high. However, if confidence level is low, target appliance 901 may require a biometric test be performed and that the principal user's identity be conformed before signaling to lock 903. In this example, target appliance has a video camera 906 that may zoom in on a principal's face while the principal user stands in a designated spot or position in view of camera 906. The timing function {tx} provides just enough time to perform the biometric text and principal ID confirmation. Once the principal identity is confirmed the Target sends an electronic signal to lock 903 to enable opening of the lock using smart key 904. In this case a principal user is not required to have a personal device on hand to mitigate authentication.

One with skill in the art will appreciate that there may be many other specific implementations and use cases covering access to other types of devices or systems having devices without departing from the spirit and scope of the present invention. For example, a target that may be regulated for access might be a lighting source, a source of water, a storage locker, a safe, a computerized appliance, a dedicated mechanism, and so on.

It will be apparent to one with skill in the art that the security system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. An authentication system, comprising:
a computer appliance target requiring authentication of a user in order to access the computer appliance target, including:
    software stored on and executing by the computer appliance target;
    a biometric input device; and
    a transceiver enabling short-range wireless communication with other wireless capable devices;
    a database accessible to the computer appliance target; and
a beacon device associated with the user, including at least a transceiver and a locally stored encrypted identity token associating the beacon device with the identity of the user;
wherein the transceiver on the computer appliance target periodically scans for the beacon device within the short-range, and upon detection, establishes communication with the beacon device and requests the encrypted identity token, the beacon device receives the request and sends the encrypted identity token back to the computer appliance target which decrypts and validates the encrypted identity token by comparing the decrypted identity token data with stored token data in the database, and upon successful decryption and validation of the identity token, the software initializes a biometric test input to positively identify the user in possession of the beacon, wherein the software of the computer appliance target attempts to match the biometric input with second biometric input of the user stored in the database and corresponding with the identity token, and upon a successful match, unlocks the computer appliance target and allows the user to operate the computer appliance target.

2. The authentication system of claim 1, wherein the computer appliance target periodically re-validates the user by repeating the token exchange and biometric input during operation by the user, and upon failure, locks the user out of the computer appliance target.

3. The authentication system of claim 1 wherein the biometric input device enables any one of facial detection, fingerprint scanning, or corneal recognition.

4. The authentication system of claim 3, wherein the biometric input device is a camera enabling the facial detection and capture of an image of the user's face and the software compares the captured image with a second image of the user's face previously associated with the user and stored in the database and upon successful match of the captured image with the second image unlocks the computer appliance target for operation by the user.

5. The authentication system of claim 1, wherein an additional security step includes requiring input of a password or personal identification number (PIN) by the user.

6. The authentication system of claim 1, wherein after beacon detection, a timer function at the computer appliance target begins a predetermined countdown to end, within which time the biometric test of the user must be detected and verified, or authentication terminates and the system continues beacon detection.

7. The authentication system of claim 1, wherein a time code is implemented in the encrypted token which tracks time passed since the last synchronization between the beacon and the computer appliance target.

8. The authentication system of claim 1, wherein when the beacon is detected by the computer appliance target for the first time, the time code is set to zero and a predetermined timing constraint is applied by the computer appliance target for a beacon to be detected and validated.

9. A method for identifying a user to a computerized appliance target, the computer appliance target including software stored on and executing from the computer appliance target, comprising the steps of:
(a) periodically scanning, by a transceiver of the computer appliance target capable of at least short-range wireless communication, for a beacon device associated with a user, the beacon device also including at least a transceiver capable of short-range wireless communication and an encrypted identity token for the user;

(b) detecting the beacon device by the computer appliance target, establishing short-range wireless communication and requesting the encrypted identity token;

(c) receiving the request by the beacon device and sending the encrypted identity token to the computer appliance target;

(d) receiving the encrypted identity token at the computer appliance target, decrypting and validating the received identity token by comparing the decrypted identity token data with stored token data associated with the user and stored in the database;

(e) upon validation, the software initializes a biometric test input for the user to positively identify the user in possession of the beacon, wherein the software of the computer appliance target attempts to match the biometric input with second biometric input associated with the user and stored in the database and corresponding with the identity token, and upon a successful match, unlocks the computer appliance target and allows the user to operate the computer appliance target.

10. The method of claim 9, wherein the computer appliance target periodically re-validates the identity of the user by repeating the token exchange and biometric input during operation of the computer appliance target by the user, and upon failure validation, locks the user out of the computer appliance target.

11. The method of claim 9, wherein the biometric input device enables any one of facial detection, fingerprint scanning, or corneal recognition.

12. The method of claim 9, wherein the biometric input device is a camera enabling facial detection and capture of an image of the user's face and the software compares the captured image with a second image associated previously with the user and stored in the database and upon successful match of the captured image with the second image unlocks the computer appliance target for operation by the user.

13. The method of claim 9, wherein an additional security step includes requiring input of a password or personal identification number (PIN) by the user.

14. The method of claim 9, wherein after beacon detection, a step is provided for a timer function at the computer appliance target which begins a predetermined countdown to end, within which time the biometric test of the user must be detected and verified, or authentication terminates and the system continues beacon detection.

15. The method of claim 9, wherein a time code is implemented in the encrypted token tracking time passed since the last synchronization between the beacon and the computer appliance target.

16. The method of claim 9, wherein when the beacon is detected by the computer appliance target for the first time, the time code is set to zero and a predetermined timing constraint is applied by the computer appliance target for a beacon to be detected and validated.

* * * * *